US011932466B2

(12) United States Patent
Ito

(10) Patent No.: US 11,932,466 B2
(45) Date of Patent: Mar. 19, 2024

(54) BATTERY PACKAGING CONTAINER

(71) Applicant: FDK CORPORATION, Tokyo (JP)

(72) Inventor: Takuro Ito, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 17/647,725

(22) Filed: Jan. 11, 2022

(65) Prior Publication Data

US 2022/0258910 A1 Aug. 18, 2022

(30) Foreign Application Priority Data

Feb. 12, 2021 (JP) ................................ 2021-021018

(51) Int. Cl.
*B65D 5/50* (2006.01)
*B65D 5/20* (2006.01)
(Continued)

(52) U.S. Cl.
CPC ........ *B65D 5/5007* (2013.01); *B65D 2585/88* (2013.01)

(58) Field of Classification Search
CPC .. B65D 25/10; B65D 25/108; B65D 2585/88; B65D 5/20; B65D 5/5007; B65D 5/5021; B65D 1/00; B65D 1/02; B65D 1/0207; B65D 1/0215; B65D 1/28; B65D 2251/0015; B65D 2251/0093; B65D 23/02; B65D 23/0807; B65D 23/0814; B65D 23/0835; B65D 2571/00339;
(Continued)

(56) References Cited

U.S. PATENT DOCUMENTS 2,137,420 A * 11/1938 Soybel ................. B65D 5/5226
229/161
2,951,583 A * 9/1960 Sanford ............... B65D 5/5021
206/754
(Continued)

FOREIGN PATENT DOCUMENTS

CN 105235971 A * 1/2016 ............. B65D 5/061
CN 110667970 A * 1/2020 ............... B65D 5/22
(Continued)

OTHER PUBLICATIONS

Extended European Search Report dated Jul. 13, 2022, for corresponding European Application No. 22154527.0.

*Primary Examiner* — Anthony D Stashick
*Assistant Examiner* — Marcos Javier Rodriguez Molina
(74) *Attorney, Agent, or Firm* — Kinney & Lange, P.A.

(57) ABSTRACT

A battery packaging container includes: a plate-shaped bottom wall; a first lateral wall formed integrally with the bottom wall; a second lateral wall formed integrally with the bottom wall; a partition wall formed integrally with the first lateral wall and extending diagonally from an upper end of the first lateral wall toward the second edge of the bottom wall; and a lid formed integrally with the second lateral wall and extending from an upper end of the second lateral wall to cover the partition wall from above. The partition wall includes a storage hole to store a battery, the storage hole being defined by an end portion of the partition wall, a root portion located on an opposite side of the end portion, and a pair of lateral portions connecting the end portion and the root portion.

17 Claims, 9 Drawing Sheets

(51) Int. Cl.
  *B65D 5/70* (2006.01)
  *H01M 50/202* (2021.01)
  *H01M 50/204* (2021.01)
  *H01M 50/238* (2021.01)
  *H01M 50/244* (2021.01)

(58) Field of Classification Search
  CPC ........ B65D 2571/0037; B65D 35/02; B65D 41/045; B65D 41/3428; B65D 5/248; B65D 5/48006; B65D 5/4802; B65D 5/541; B65D 5/66; B65D 5/70; B65D 51/20; B65D 53/04; B65D 65/46; B65D 65/466; B65D 71/0022; B65D 75/36; B65D 75/366; B65D 83/04
  USPC ........ 206/0.5, 0.81, 0.82, 0.84, 1.5, 1.7, 6.1,
    206/18, 38, 39.6, 45.2, 45.21, 45.23,
    206/45.28, 45.29, 45.3, 83.5, 86, 94, 95,
    206/148, 153, 157, 166, 172, 174, 175,
    206/188, 193, 194, 197, 204, 205, 210,
    206/213.1, 214, 215, 216, 219, 221, 222,
    206/223, 225, 229, 232, 233, 242, 256,
    206/259, 261, 264, 265, 268, 273, 277,
    206/278, 279, 280, 288, 289, 290, 292,
    206/299, 303, 305, 307.1, 308.1, 308.2,
    206/308.3, 311, 312, 314, 315.1, 315.3,
    206/320, 322, 323, 335, 336, 348, 362.4,
    206/364, 366, 370, 380, 386, 387.1,
    206/387.13, 395, 396, 397, 408, 409, 423,
    206/424, 425, 427, 429, 432, 433, 434,
    206/438, 439, 440, 441, 443, 446, 447,
    206/449, 451, 453, 457, 459.1, 459.5,
    206/460, 461, 462, 463, 464, 467, 469,
    206/470, 471, 472, 482, 484, 484.2, 485,
    206/485.1, 486, 487, 489, 493, 494, 497,
    206/499, 503, 508, 509, 511, 514, 518,
    206/521.1, 522, 523, 524.1, 524.2, 524.3,
    206/524.4, 524.6, 524.7, 524.8, 525, 526,
    206/527, 528, 531, 534, 535, 540, 541,
    206/549, 551, 553, 554, 555, 557, 558,
    206/559, 561, 562, 564, 565, 566, 568,
    206/570, 581, 584, 585, 586, 588, 591,
    206/592, 594, 597, 599, 600, 703, 731,
    206/733, 734, 736, 738, 739, 744, 746,
    206/747, 751, 752, 755, 756, 762, 763,
    206/764, 765, 766, 767, 769, 772, 774,
    206/775, 776, 779, 783, 784, 804, 806,
    206/807, 812, 813, 815, 819, 823, 831,
    206/217, 246, 297, 307, 316.1, 316.2,
    206/319, 326, 349, 361, 362.2, 363, 37,
    206/37.8, 372, 373, 391, 410, 418, 419,
    206/422, 45.22, 466, 468, 476, 505, 521,
    206/524, 524.5, 532, 536, 538, 539, 545,
    206/573, 575, 577, 579, 583, 63.5, 701,
    206/704, 705, 722, 723, 725, 728, 800,
    206/817, 818, 820, 96, 703 C; 215/12.1,
    215/12.2, 228, 307, 383, 386, 398, 902;
    220/1.5, 1.6, 4.01, 4.08, 4.21, 4.22, 4.23,
    220/4.28, 6, 7, 9.2, 23.4, 23.6, 23.83,
    220/23.86, 23.87, 23.88, 23.89, 62, 62.12,
    220/62.15, 62.19, 62.2, 62.21, 62.22,
    220/86.1, 87.1, 89.2, 200, 203.01, 203.09,
    220/211, 212, 212.5, 216, 230, 255.1,
    220/260, 265, 270, 272, 279, 288, 315,
    220/324, 345.1, 345.2, 359.1, 359.2,
    220/359.3, 495.01, 495.04, 495.05,
    220/495.06, 495.07, 495.08, 500, 503,
    220/504, 505, 507, 512, 516, 520, 521,
    220/522, 529, 556, 560.01, 574.1, 575,
    220/592.01, 592.1, 592.19, 592.2, 592.21,
    220/592.22, 592.23, 592.25, 592.26,
    220/592.27, 592.28, 600, 601, 608, 612,
    220/629, 630, 642, 643, 657, 660, 661,
    220/666, 669, 670, 676, 680, 681, 682,
    220/692, 694, 703, 705, 709, 711, 713,
    220/720, 729, 738, 745, 751, 752, 796,
    220/810, 831, 833, 837, 902, 908, 908.1,
    220/910, 912, 916, DIG. 14, DIG. 16;
    221/305; 53/111 RC, 113, 128.1, 131.2,
    53/143, 151, 156, 167, 169, 172, 174,
    53/176, 201, 204, 207, 209, 210, 223,
    53/234, 235, 236, 244, 245, 246, 247,
    53/248, 249, 250, 251, 254, 255, 266.1,
    53/268, 281, 282, 284.5, 285, 290, 299,
    53/316, 317, 319, 329.5, 367, 370, 370.2,
    53/370.6, 371.3, 371.9, 372.2, 373.4,
    53/374.3, 374.8, 375.9, 376.3, 376.4,
    53/376.5, 377.2, 387.1, 387.2, 387.3,
    53/389.1, 399, 410, 411, 412, 416, 419,
    53/425, 426, 428, 429, 434, 436, 440,
    53/441, 442, 445, 446, 447, 448, 451,
    53/452, 455, 456, 458, 459, 461, 462,
    53/467, 469, 472, 473, 474, 475, 476,
    53/477, 478, 480, 487, 49, 491, 500, 501,
    53/502, 506, 507, 508, 52, 526, 527, 53,
    53/532, 534, 535, 537, 539, 540, 542,
    53/543, 544, 548, 55, 556, 558, 559, 562,
    53/567, 578, 588, 589, 592, 64, 67, 74;
    222/1, 103, 105, 106, 107, 129.1, 129.3,
    222/131, 132, 135, 144, 144.5, 145.1,
    222/146.1, 146.2, 146.5, 146.6, 159, 165,
    222/166, 173, 175, 181.1, 181.2, 181.3,
    222/183, 185.1, 189.06, 190, 192, 196,
    222/206, 213, 214, 23, 233, 25, 288, 29,
    222/318, 325, 326, 333, 334, 380, 383.1,
    222/386, 386.5, 390, 396, 397, 399, 41,
    222/447, 465.1, 504, 52, 527, 541.6, 544,
    222/560, 570, 571, 572, 575, 606, 608,
    222/626, 63, 639, 64, 66, 71, 81, 88, 90,
    222/94, 95; 229/100, 101, 101.1, 102,
    229/103, 103.1, 103.11, 103.2, 103.3,
    229/104, 106, 107, 108, 109, 110, 112,
    229/113, 114, 115, 116, 116.1, 116.2,
    229/116.3, 116.4, 116.5, 117, 117.01,
    229/117.02, 117.03, 117.05, 117.06,
    229/117.07, 117.09, 117.12, 117.13,
    229/117.14, 117.15, 117.16, 117.17,
    229/117.19, 117.21, 117.22, 117.24,
    229/117.25, 117.27, 117.3, 117.31,
    229/117.32, 117.33, 117.35, 119, 120,
    229/120.01, 120.011, 120.03, 120.06,
    229/120.08, 120.09, 120.1, 120.11,
    229/120.12, 120.13, 120.14, 120.15,
    229/120.16, 120.17, 120.18, 120.21,
    229/120.22, 120.24, 120.26, 120.29,
    229/120.32, 120.33, 120.34, 120.36,
    229/120.37, 120.38, 121, 122, 122.1,
    229/122.2, 122.21, 122.22, 122.23,
    229/122.27, 122.3, 122.31, 122.32,
    229/122.33, 122.34, 123, 123.1, 123.2,
    229/123.3, 124, 125, 125.01, 125.015, 229/125.02, 125.04, 125.05, 125.08,
229/125.09, 125.11, 125.12, 125.125,
229/125.14, 125.15, 125.16, 125.17,
229/125.19, 125.21, 125.22, 125.23,
229/125.26, 125.28, 125.29, 125.31,
229/125.32, 125.33, 125.35, 125.36,
229/125.37, 125.38, 125.39, 125.41,
229/125.42, 126, 127, 128, 129.1, 130,
229/131, 131.1, 132, 134, 137, 138, 141,
229/142, 143, 144, 145, 146, 147, 148,
229/149, 150, 151, 152, 153, 154, 155,
229/157, 158, 160, 160.1, 160.2, 161,
229/162.1, 162.4, 162.6, 162.7, 163, 164,
229/164.1, 164.2, 165, 166, 167, 168,
229/169, 170, 171, 172, 173, 174, 175,
229/176, 177, 178, 180, 181, 182, 182.1,
229/183, 184, 185, 185.1, 186, 188, 190,
229/192, 193, 194, 195, 196, 198, 198.1,
229/198.2, 198.3, 199, 200, 204, 206,
229/207, 208, 210, 211, 212, 215, 216,
229/217, 218, 219, 220, 221, 224, 225,
229/226, 227, 228, 229, 231, 232, 233,
229/234, 235, 237, 238, 239, 240, 241,
229/242, 245, 246, 4.5, 404, 406, 5.5,
229/5.81, 5.82, 5.84, 5.85, 67.1, 80, 80.5,
229/87.01, 87.05, 87.06, 87.07, 87.08,
229/87.18, 87.19, 89, 900, 902, 903, 904,
229/905, 906, 915, 916, 917, 918, 919,
229/920, 921, 922, 923, 924, 926, 93,
229/930, 931, 938, 939, 940, 941, 942;
D9/416

See application file for complete search history.

(56) References Cited

U.S. PATENT DOCUMENTS

| | | | | |
|---|---|---|---|---|
| 3,746,156 | A * | 7/1973 | Austin, Jr. | B65D 5/5009 |
| | | | | 206/277 |
| 5,121,838 | A * | 6/1992 | Dickie | B65D 5/5021 |
| | | | | 206/707 |
| 5,428,940 | A | 7/1995 | Paumen et al. | |
| 5,505,309 | A * | 4/1996 | Taravella | B65D 5/504 |
| | | | | 493/56 |
| 6,971,524 | B1 * | 12/2005 | Voswinkel | B65D 5/5011 |
| | | | | 206/767 |
| 2014/0312109 | A1 * | 10/2014 | Weston | B65D 5/6655 |
| | | | | 229/120.08 |

FOREIGN PATENT DOCUMENTS

| | | | | |
|---|---|---|---|---|
| FR | 2801574 A1 * | 6/2001 | | B65D 5/5021 |
| JP | H08156993 A | 6/1996 | | |
| JP | H11130047 A | 5/1999 | | |
| JP | 2005093334 A | 4/2005 | | |
| JP | 2018181426 A | 11/2018 | | |

* cited by examiner

BATTERY PACKAGING CONTAINER

CROSS-REFERENCE TO RELATED APPLICATION(S)

This application claims priority to Japanese Application No. 2021-021018 filed on Feb. 12, 2021, the contents of which are incorporated herein by reference in their entirety.

BACKGROUND

Technical Field

The present disclosure relates to a battery packaging container.

Description of the Related Art

Packaging devices that package electronic components, batteries, etc., have been known. For example, a packaging device disclosed in JP H08-156993 A is constituted of a bottom plate, side plates bent so as to extend upward continuously from the bottom plate, inclined plates bent continuously from the side plates toward the bottom plate side, and fixed plates bent continuously from the inclined plates to be connected on the bottom plate. The bottom plate, the side plates, and the inclined plates form triangle storage spaces. The inclined plates are further provided with storage window areas formed by bending two window pieces into the storage space. In the packaging device, electronic components are stored in the storage window area in the inclined plates.

According to the disclosure of JP H08-156993 A, it is possible to store two packaging devices in an exterior box made of a cardboard, place a cover plate on top of the packaging devices, and close a lid plate of the exterior box to complete packaging. However, in this case, the exterior box and the cover plate are needed additionally from the packaging devices, and this causes an increase in the number of assembling steps and an increase in the number of parts.

The present disclosure has been made in view of such issues, and an objective of the present disclosure is to provide a battery packaging container that achieves reduction in the number of assembling steps and reduction in the number of parts.

SUMMARY

In order to accomplish the above, a battery packaging container of the present disclosure comprises: a plate-shaped bottom wall; a first lateral wall formed integrally with the bottom wall and extending upward from a first edge that is part of a contour of the bottom wall; a second lateral wall formed integrally with the bottom wall and extending upward from a second edge that is a portion opposing to the first edge in the contour of the bottom wall; a partition wall formed integrally with the first lateral wall and extending diagonally from an upper end of the first lateral wall toward the second edge of the bottom wall; and a lid formed integrally with the second lateral wall and extending from an upper end of the second lateral wall to cover the partition wall from above. The partition wall includes a storage hole to store a battery, the storage hole being defined by an end portion of the partition wall, a root portion located on an opposite side of the end portion, and a pair of lateral portions connecting the end portion and the root portion.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

Embodiments of the present disclosure will be described below with reference to the drawings.

First Embodiment

Figure 1:
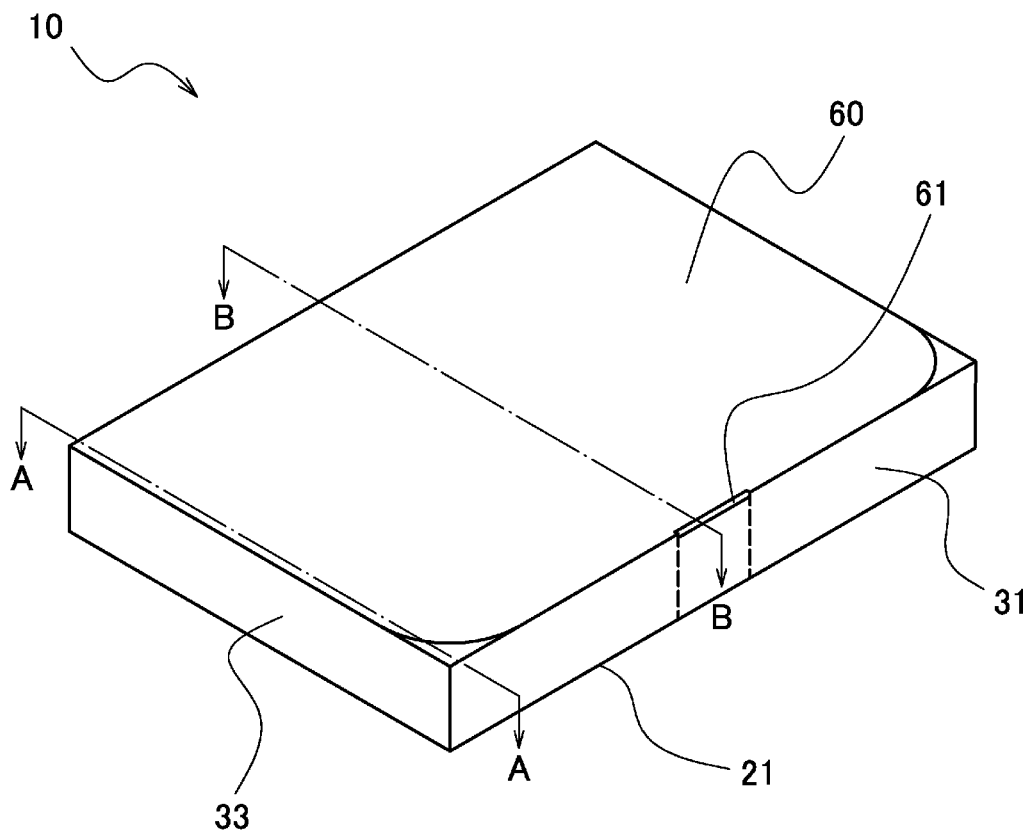
FIG. 1 is a perspective view showing a battery packaging container according to a first embodiment.
Figure 1:
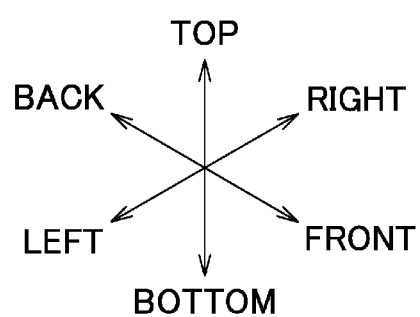
Figure 2:
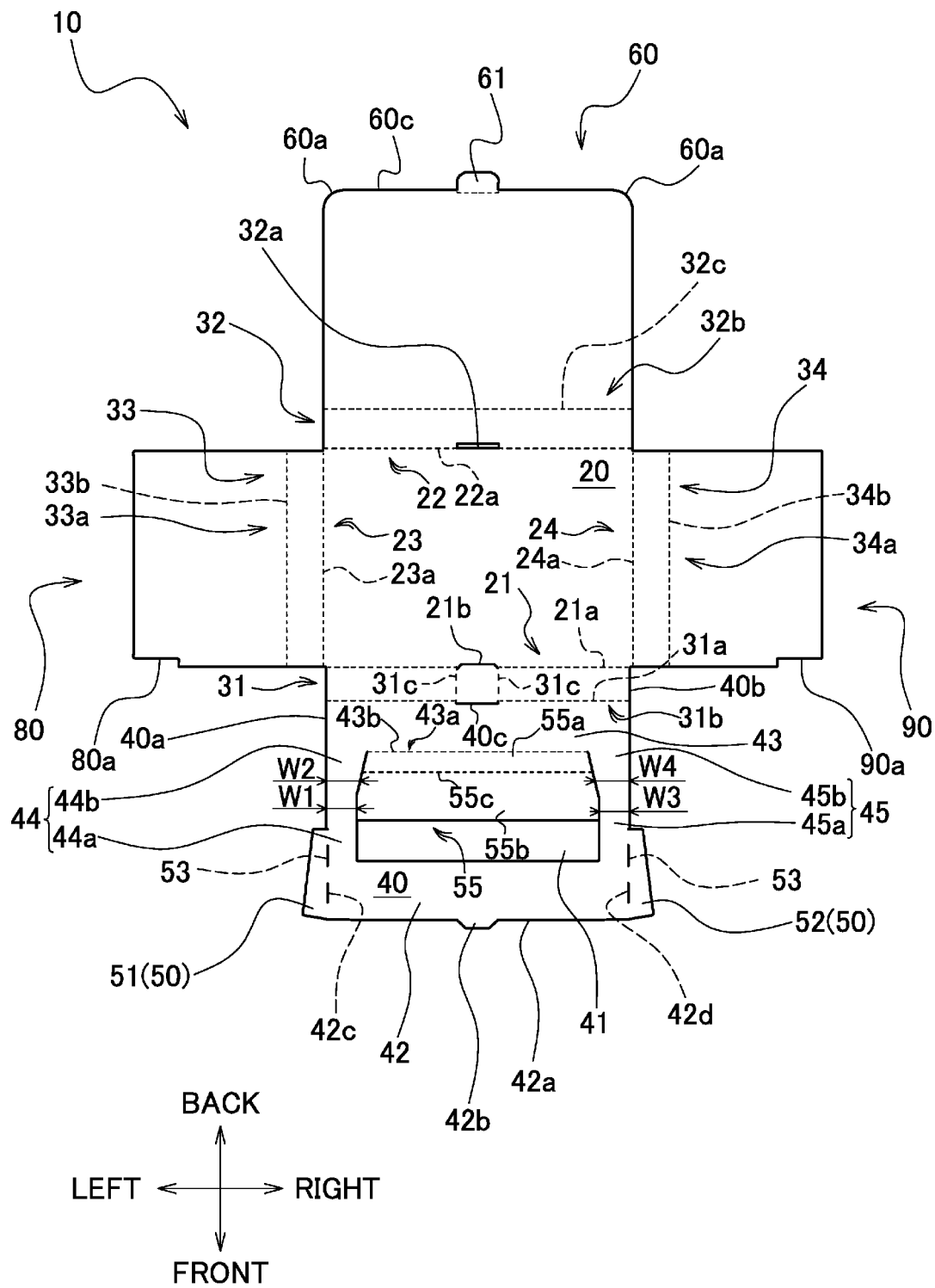
FIG. 2 is an expanded view showing the expanded battery packaging container shown in FIG. 1.
Figure 3:
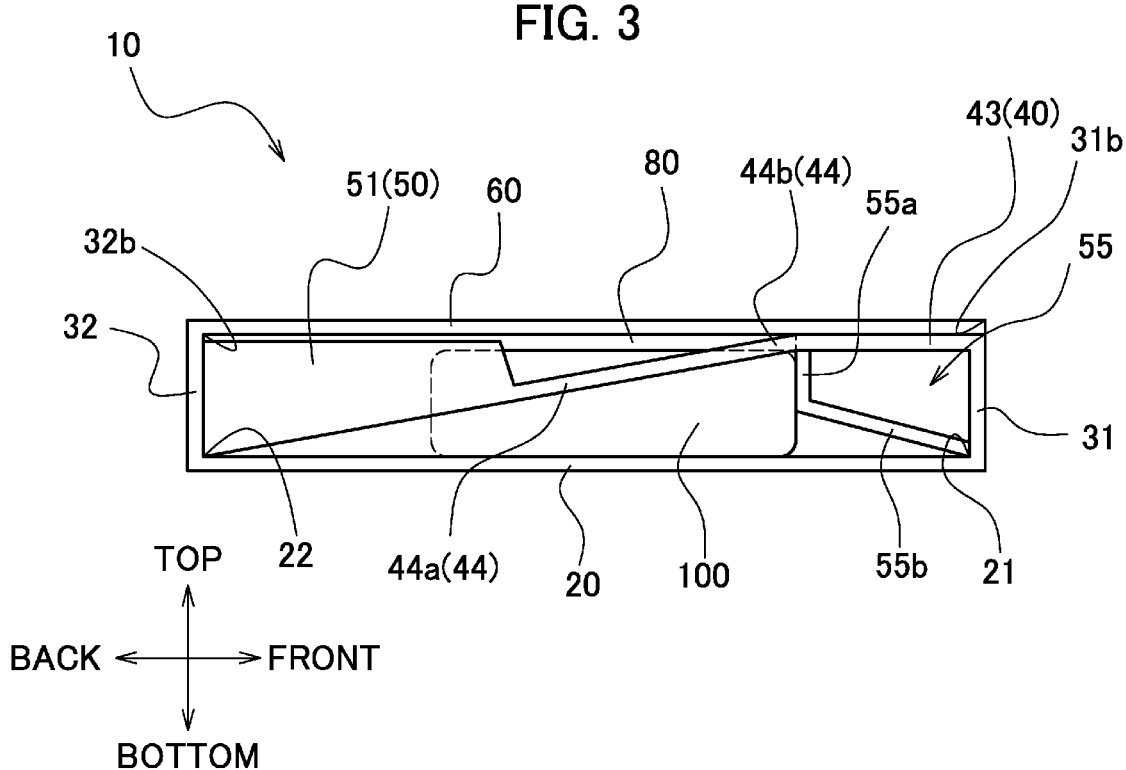
FIG. 3 is a cross-sectional view along a cross-section A-A in FIG. 1.
Figure 4:
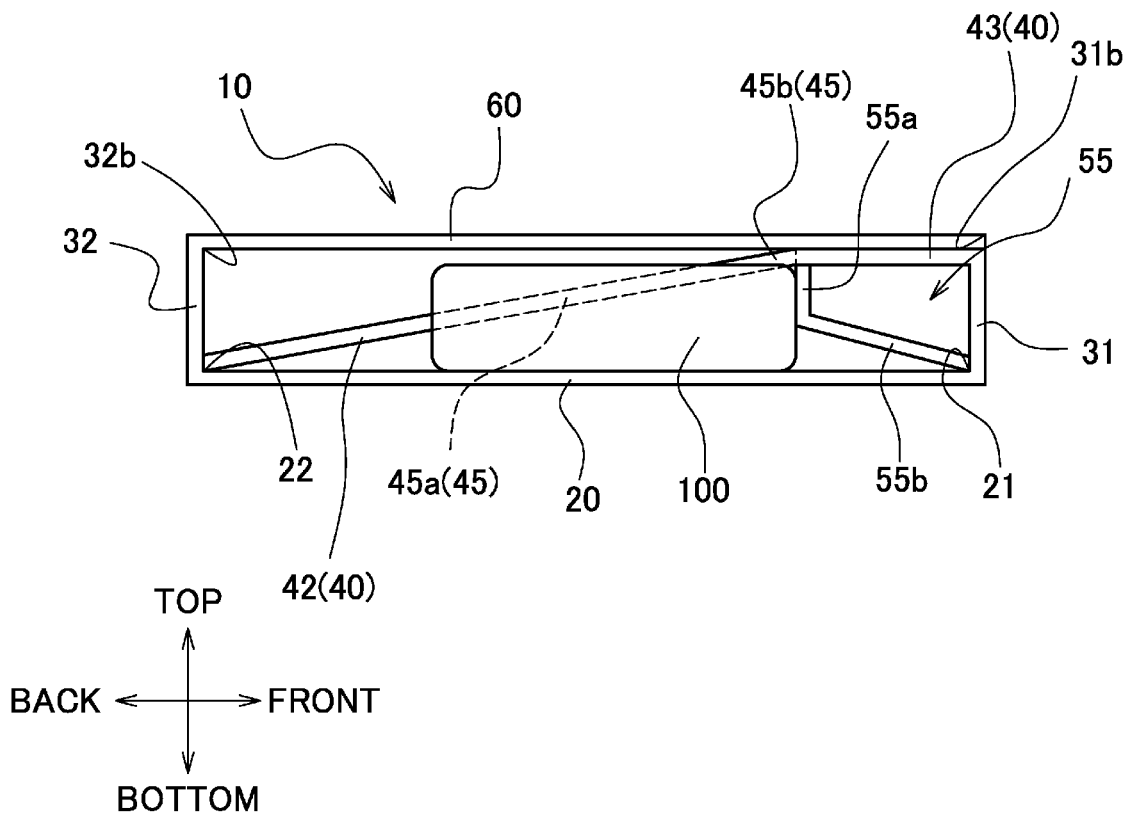
FIG. 4 is a cross-sectional view along a cross-section B-B in FIG. 1.

FIG. 1 is a perspective view showing a battery packaging container 10 according to a first embodiment. FIG. 2 is an expanded view showing the expanded battery packaging container 10 shown in FIG. 1. FIG. 3 is a cross-sectional view along a cross-section A-A in FIG. 1. FIG. 4 is a cross-sectional view along a cross-section B-B in FIG. 1.

For the convenience of explanation, in the battery packaging container 10, a side on which a bottom wall 20 is arranged is defined as "bottom", and a side on which a lid 60 is arranged in the state where the assembly of the battery packaging container 10 is completed is defined as "top". In the battery packaging container 10, a side on which a first flap 80 is arranged is defined as "left" and a side on which a second flap 90 is arranged is defined as "right". In addition, a direction perpendicular to a top-bottom direction and a right-left direction is defined as "front" and "back". Hereinafter, the terms "front", "back", "left", "right", "top" and "bottom" shown in the drawings are all based on these definitions.

<Battery Packaging Container 10>

The battery packaging container 10 in the present embodiment is in an approximately rectangular parallelepiped shape in an assembled state (FIG. 1). The battery packaging container 10 is configured from a single paper template that is formed by punching out a cardboard or the like by a press or other machines (FIG. 2). As shown in FIG. 2, the battery packaging container 10 includes a plate-shaped bottom wall 20, a first lateral wall 31 formed integrally with the bottom wall 20, a second lateral wall 32 formed integrally with the bottom wall, a third lateral wall 33 formed integrally with the bottom wall 20, a fourth lateral wall 34 formed integrally with the bottom wall 20, a partition wall 40 formed integrally with the first lateral wall 31, a pair of lateral edge support walls 50 formed integrally with the partition wall 40, a base 55 formed integrally with the partition wall 40, a lid 60 formed integrally with the second lateral wall 32, a first flap 80 formed integrally with the third lateral wall 33, and a second flap 90 formed integrally with the fourth lateral wall 34. The battery packaging container 10 is widely used for packaging batteries, and used for a variety of applications, such as for conveying batteries, and for displaying batteries.

<Bottom Wall 20>

The bottom wall 20 is rectangular as shown in FIG. 2. The bottom wall 20 is linked to the first lateral wall 31 at a bottom wall front edge 21 located on the front side of the bottom wall 20 via a bottom wall front bending line 21a extending in a right-left direction. The bottom wall 20 is also linked to the second lateral wall 32 at a bottom wall back edge 22 located on the back side of the bottom wall 20 via a bottom wall back bending line 22a extending in the right-left direction. The bottom wall 20 is also linked to the third lateral wall 33 at a bottom wall left edge 23 located on the left side of the bottom wall 20 via a bottom wall left bending line 23a extending in a front-back direction. The bottom wall 20 is also linked to the fourth lateral wall 34 at a bottom wall right edge 24 located on the right side of the bottom wall 20 via a bottom wall right bending line 24a extending in the front-back direction. The bottom wall 20 also includes a bottom wall front cut 21b in the vicinity of the bottom wall front edge 21. The bottom wall front cut 21b extends in the right-left direction in parallel to the bottom wall front bending line 21a and extends through the bottom wall 20 in the top-bottom direction.

<First Lateral Wall 31>

As shown in FIGS. 1 and 2, the first lateral wall 31 is rectangular. In the state where the battery packaging container 10 is assembled, the first lateral wall 31 extends upward from the bottom wall front edge 21 (first edge) that is part of a contour of the bottom wall 20. Specifically, the first lateral wall 31 is bent at the bottom wall front bending line 21a to extend upward from the bottom wall front edge 21. As shown in FIG. 2, the first lateral wall 31 is linked to the partition wall 40 at a first lateral wall front edge 31b located on the front side of the first lateral wall 31 via a first lateral wall front bending line 31a extending in the right-left direction. In addition, the first lateral wall 31 has a pair of perforations 31c, which extends forward continuously from the bottom wall front cut 21b.

<Second Lateral Wall 32>

As shown in FIG. 2, the second lateral wall 32 is rectangular. In the state where the battery packaging container 10 is assembled, the second lateral wall 32 extends upward from the bottom wall back edge 22 (second edge) that is a portion on the side opposing to the bottom wall front edge 21 in the contour of the bottom wall 20. Specifically, the second lateral wall 32 is bent at the bottom wall back bending line 22a to extend upward from the bottom wall back edge 22. As shown in FIG. 2, the second lateral wall 32 includes a second lateral wall engagement hole 32a (engagement hole) extending through the second lateral wall 32. Specifically, in the vicinity of the bottom wall back edge 22, the second lateral wall engagement hole 32a extends in the right-left direction in parallel to the bottom wall back bending line 22a, and extends through the second lateral wall 32 in the top-bottom direction. As shown in FIG. 2, the second lateral wall 32 is linked to the lid 60 at a second lateral wall back edge 32b located on the back side of the second lateral wall 32 via a second lateral wall back bending line 32c extending in the right-left direction.

<Third Lateral Wall 33, Fourth Lateral Wall 34>

As shown in FIG. 2, the third lateral wall 33 and the fourth lateral wall 34 are rectangular. In the state where the battery packaging container 10 is assembled, the third lateral wall 33 extends upward from the bottom wall left edge 23 (third edge) that is a portion connecting the bottom wall front edge 21 and the bottom wall back edge 22 in the contour of the bottom wall 20. Specifically, the third lateral wall 33 is bent at the bottom wall left bending line 23a to extend upward from the bottom wall left edge 23. The fourth lateral wall 34 extends upward from the bottom wall right edge 24 (fourth edge) that is a portion on the side opposing to the bottom wall left edge 23 in the contour of the bottom wall 20. Specifically, the fourth lateral wall 34 is bent at the bottom wall right bending line 24a to extend upward from the bottom wall right edge 24. As shown in FIG. 2, the third lateral wall 33 is linked to the first flap 80 at a third lateral wall left edge 33a located on the left side of the third lateral wall 33 via a third lateral wall left bending line 33b extending in the front-back direction. The fourth lateral wall 34 is linked to the second flap 90 at a fourth lateral wall right edge 34a located on the right side of the fourth lateral wall 34 via a fourth lateral wall right bending line 34b extending in the front-back direction.

<Partition Wall 40>

As shown in FIG. 2, the partition wall 40 is approximately rectangular. As shown in FIGS. 3 and 4, in the state where the battery packaging container 10 is assembled, the partition wall 40 extends diagonally from the first lateral wall front edge 31b (upper end) of the first lateral wall 31 toward the bottom wall back edge 22 of the bottom wall 20. Specifically, the partition wall 40 is bent at the first lateral wall front bending line 31a to extend diagonally from the first lateral wall front edge 31b toward the bottom wall back edge 22. The partition wall 40 also includes a storage hole 41 to store a battery 100. The storage hole 41 is defined by a end portion 42 of the partition wall 40, a root portion 43 located on the opposite side of the end portion 42, a left lateral portion 44 (a pair of lateral portions) that connects the end portion 42 and the root portion 43 on the left side, and a right lateral portion 45 (a pair of lateral portions) that connects the end portion 42 and the root portion 43 on the right side. The end portion 42 is a portion extending in the right-left direction on the front side of the storage hole 41. The root portion 43 is a portion extending in the right-left direction at the back of the storage hole 41. The left lateral portion 44 is a portion extending in the front-back direction on the left side of the storage hole 41. The right lateral portion 45 is a portion extending in the front-back direction on the right side of the storage hole 41. More specifically, as shown in FIGS. 3 and 4, in the state where the battery packaging container 10 is assembled, the root portion 43 is a portion extending horizontally or approximately horizontally backward from the first lateral wall front edge 31b. The left lateral portion 44 and the right lateral portion 45 are portions extending diagonally from the root portion 43 to the bottom wall back edge 22. The end portion 42 is a portion in contact with the bottom wall 20 and the second lateral wall 32. As shown in FIG. 2, the root portion 43 is linked to a base 55 at a root portion front edge 43a located on the front side of the root portion 43 via a root portion front bending line 43b extending in the right-left direction.

As shown in FIG. 2, the left lateral portion 44 of the partition wall 40 is constituted of a left end lateral portion 44a located on the side of the end portion 42, and a left root lateral portion 44b located on the side of the root portion 43. The right lateral portion 45 of the partition wall 40 is constituted of a right end lateral portion 45a located on the side of the end portion 42, and a right root lateral portion 45b located on the side of the root portion 43. Each width of the left lateral portion 44 and the right lateral portion 45 (a pair of lateral portions) in the partition wall 40 is formed to be wider toward the side of the root portion 43 from the side of the end portion 42. Specifically, as shown in FIG. 2, a width W1 in the right-left direction in the left end lateral portion 44a is formed to be a constant width, and a width W2 in the right-left direction in the left root lateral portion 44b is formed to be gradually wider toward the back side from the front side. Similarly, a width W3 in the right-left direction in the right end lateral portion 45a is formed to be a constant width, and a width W4 in the right-left direction in the right root lateral portion 45b is formed to be gradually wider toward the back side from the front side. Note that the width W1 in the right-left direction in the left end lateral portion 44a and the width W3 in the right-left direction in the right end lateral portion 45a may be identical to or different from each other. The width W2 in the right-left direction in the left root lateral portion 44b and the width W4 in the right-left direction in the right root lateral portion 45b may be identical to or different from each other.

As shown in FIG. 2, the partition wall 40 includes an engagement protrusion 42b protruding from a leading edge 42a of the end portion 42. Specifically, as shown in FIG. 2, the engagement protrusion 42b protrudes forward from the leading edge 42a, and is formed to be narrower toward the front side from the back side. In the state where the battery packaging container 10 is assembled, the engagement protrusion 42b is inserted into the second lateral wall engagement hole 32a, and holds the partition wall 40 to the second lateral wall 32. The partition wall 40 also includes a partition wall back cut 40c in the vicinity of the first lateral wall front edge 31b. The partition wall back cut 40c extends in the right-left direction in parallel to the first lateral wall front bending line 31a and extends through the partition wall 40 in the top-bottom direction. In the state where the battery packaging container 10 is assembled, the partition wall back cut 40c receives a holding protrusion 61 of the lid 60 as will be described later.

<Pair of Lateral Edge Support Walls 50>

As shown in FIG. 2, a pair of lateral edge support walls 50 is constituted of a left lateral edge support wall 51 located on the left side of the partition wall 40 and a right lateral edge support wall 52 located on the right side of the partition wall 40. The left lateral edge support wall 51 and the right lateral edge support wall 52 are each linked to the partition wall 40 via a first folding perforation 53. In the state where the battery packaging container 10 is assembled, the left lateral edge support wall 51 and the right lateral edge support wall 52 (a pair of lateral edge support walls 50) extend upward from a left lateral edge 40a located on the left side of the partition wall 40 and a right lateral edge 40b located on the right side of the partition wall 40. Specifically, the left lateral edge support wall 51 is provided at a portion corresponding to the end portion 42 and the left end lateral portion 44a in the left lateral edge 40a, and the right lateral edge support wall 52 is provided at a portion corresponding to the end portion 42 and the right end lateral portion 45a in the right lateral edge 40b. The left lateral edge support wall 51 and the right lateral edge support wall 52 may extend upward at least from both the lateral edges 42c, 42d in the end portion 42, respectively. For example, the left lateral edge support wall 51 and the right lateral edge support wall 52 may be provided only in a portion of the end portion 42 in each of the left lateral edge 40a and the right lateral edge 40b. Both the lateral edges in the end portion 42 refer to the left lateral edge of end portion 42c located on the left side of the end portion 42 and the right lateral edge of end portion 42d located on the right side of the end portion 42. Each width of the left lateral edge support wall 51 and the right lateral edge support wall 52 are formed to be wider toward the front side from the back side (FIG. 2). Accordingly, in the state where the battery packaging container 10 is assembled, the left lateral edge support wall 51 and the right lateral edge support wall 52 support the lid 60 (FIGS. 3 and 4).

<Base 55>

As shown in FIGS. 3 and 4, in the state where the battery packaging container 10 is assembled, the base 55 extends downward from the root portion 43 of the partition wall 40 and is in contact with the bottom wall 20. Specifically, the base 55 is constituted of a battery contact portion 55a that is in contact with the front side of the battery 100, and a partition wall support portion 55b that is in contact with the bottom wall 20 and the first lateral wall 31.

As shown in FIG. 2, the battery contact portion 55a of the base 55 is linked to the root portion 43 of the partition wall 40 via the root portion front bending line 43b. The partition wall support portion 55b is also linked to the battery contact portion 55a via a second folding perforation 55c located on the front side of the battery contact portion 55a. The battery contact portion 55a and the partition wall support portion 55b are not linked to the left lateral portion 44 and the right lateral portion 45 of the partition wall 40. This enables the battery contact portion 55a to be bent along the root portion front bending line 43b, and the partition wall support portion 55b to be bent at the second folding perforation 55c. Hence, in the state where the battery packaging container 10 is assembled, the battery contact portion 55a is in contact with the battery 100, and the partition wall support portion 55b is in contact with the bottom wall 20 and the first lateral wall 31

<Lid 60>

As shown in FIG. 2, the lid 60 is approximately rectangular. Specifically, the lid 60 has corner portions 60a with rounded corners on both right and left ends on the back side. As shown in FIGS. 3 and 4, in the state where the battery packaging container 10 is assembled, the lid 60 extends from the second lateral wall back edge 32b (upper end) of the second lateral wall 32 to cover the partition wall 40 from above. Specifically, the lid 60 is bent at the second lateral wall back bending line 32c to extend forward from the second lateral wall back edge 32b. The lid 60 includes the holding protrusion 61 protruding backward from a back edge 60c of the lid 60. In the state where the battery packaging container 10 is assembled, the holding protrusion 61 is inserted into the partition wall back cut 40c of the partition wall 40 and holds the lid 60 to the partition wall 40.

<First Flap 80>

As shown in FIG. 2, the first flap 80 is approximately rectangular. Specifically, the first flap 80 has a designated first flap notch 80a in a front-side and left-side end portion. In the state where the battery packaging container 10 is assembled, the first flap 80 extends from the upper end of the third lateral wall 33 to partially cover the partition wall 40 from above. Specifically, the first flap 80 is bent at the third lateral wall left bending line 33b to extend rightward from the third lateral wall left edge 33a. The first flap notch 80a is formed to avoid the partition wall back cut 40c in the state where the battery packaging container 10 is assembled.

<Second Flap 90>

As shown in FIG. 2, the second flap 90 is approximately rectangular. Specifically, the second flap 90 has a designated second flap notch 90a in a front-side and right-side end portion. In the state where the battery packaging container 10 is assembled, the second flap 90 extends from the upper end of the fourth lateral wall 34 to partially cover the partition wall 40 from above. Specifically, the second flap 90 is bent at the fourth lateral wall right bending line 34b to extend leftward from the fourth lateral wall right edge 34a. The second flap notch 90a is formed to avoid the partition wall back cut 40c in the state where the battery packaging container 10 is assembled.

Figure 5:
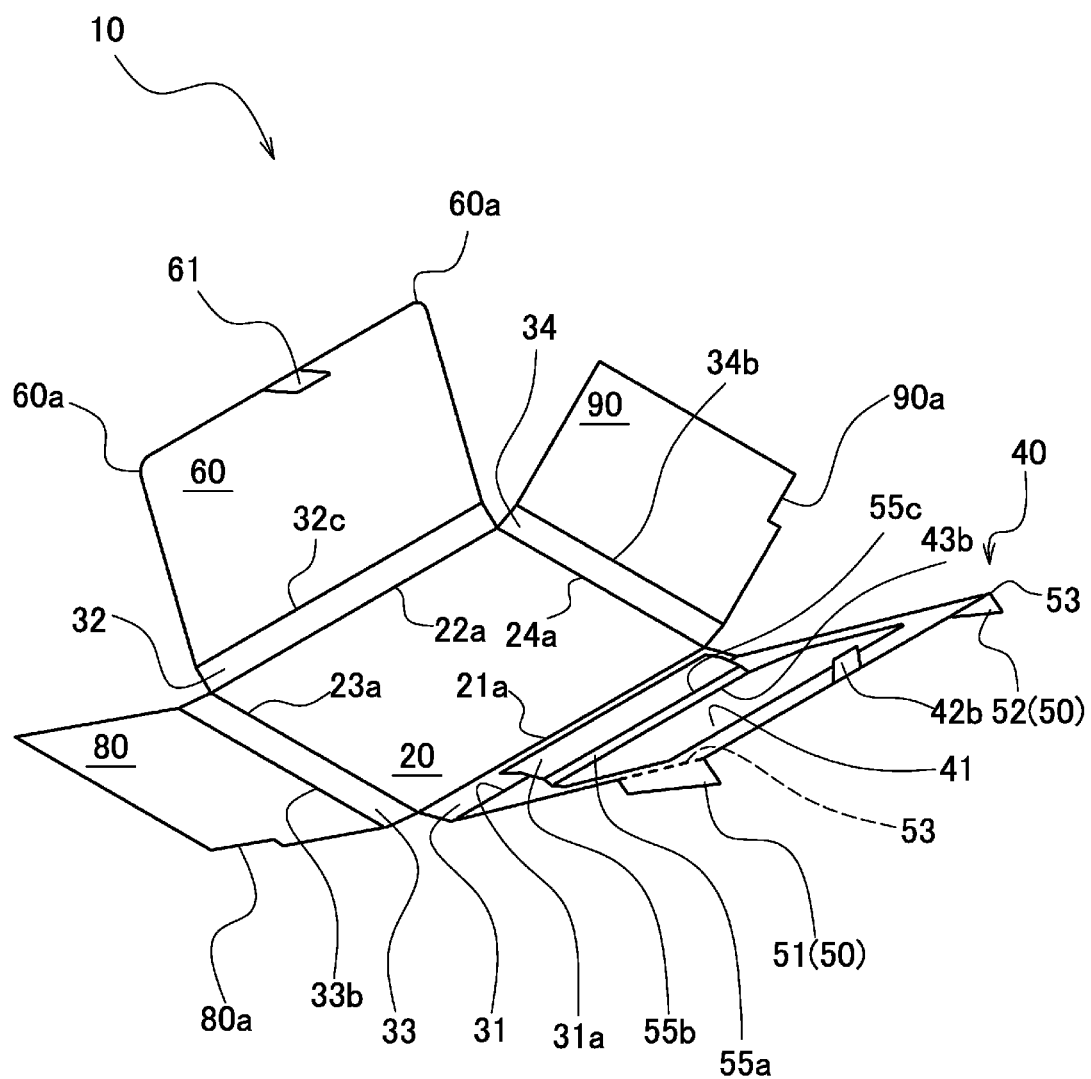
FIG. 5 is an assembly diagram showing a procedure of assembling the battery packaging container shown in FIG. 1 from the expanded state shown in FIG. 2, the procedure being a first assembling step.
Figure 5:
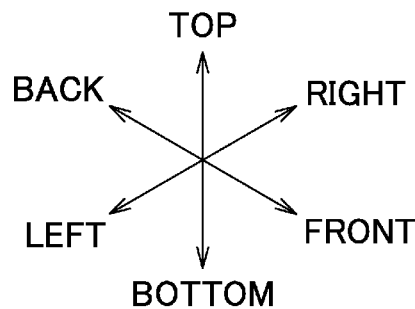
Figure 6:
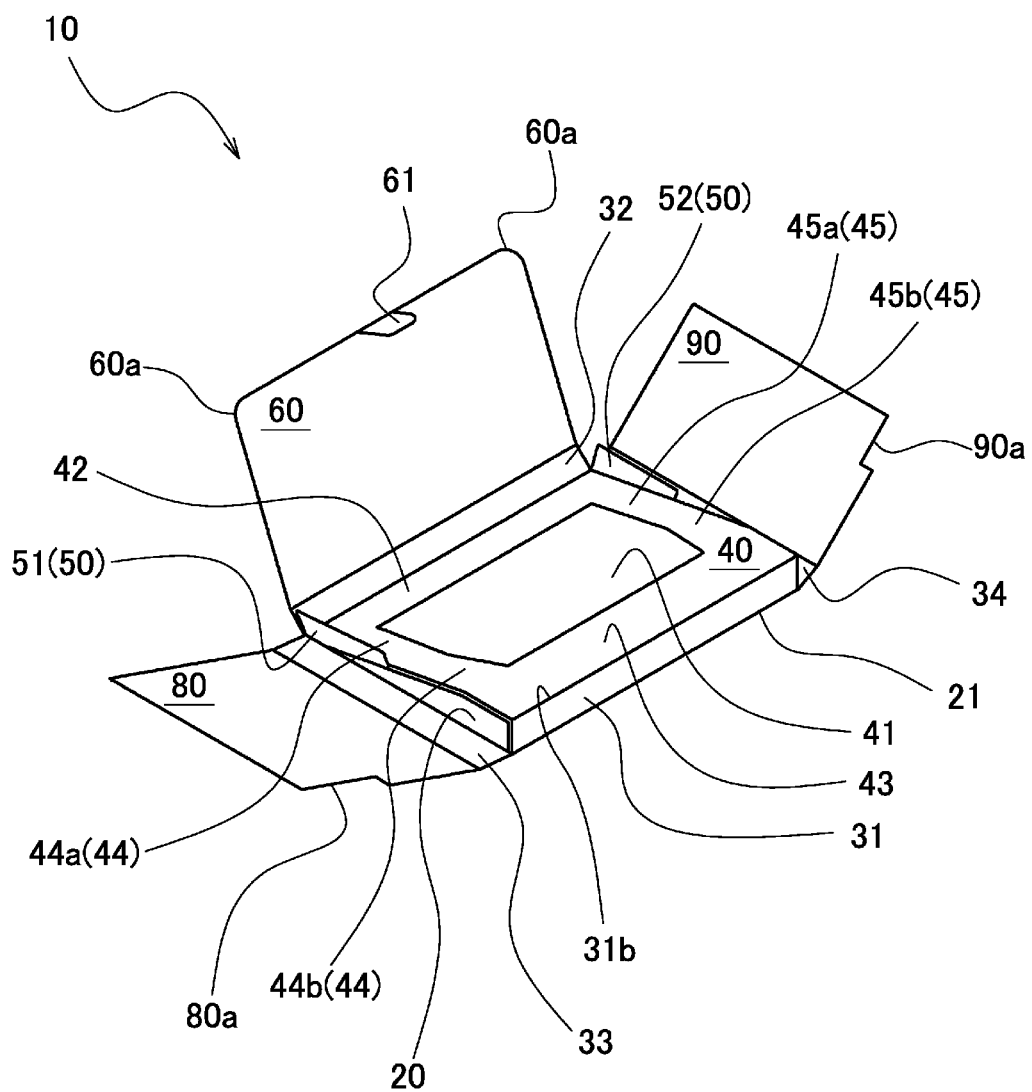
FIG. 6 is an assembly diagram showing a procedure of assembling the battery packaging container shown in FIG. 1 from the expanded state shown in FIG. 2, the procedure being a second assembling step.
Figure 6:
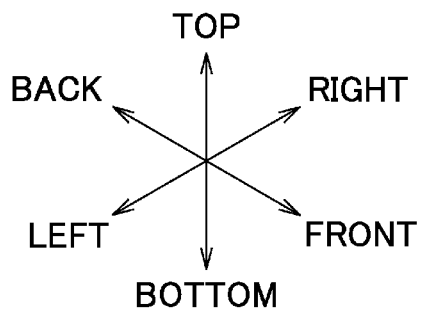
Figure 7:
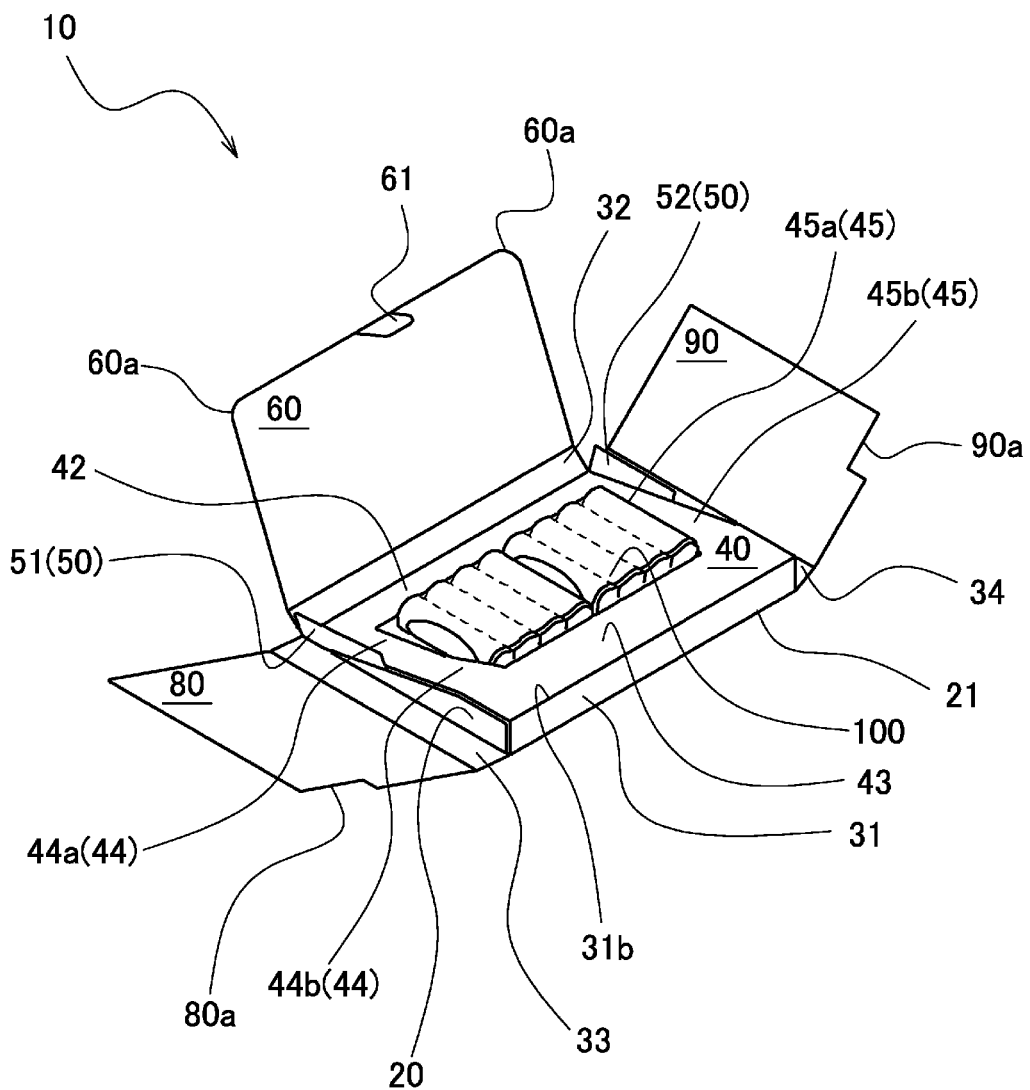
FIG. 7 is an assembly diagram showing a procedure of assembling the battery packaging container shown in FIG. 1 from the expanded state shown in FIG. 2, the procedure being a third assembling step.
Figure 7:
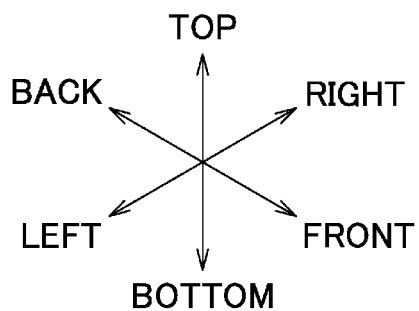
Figure 8:
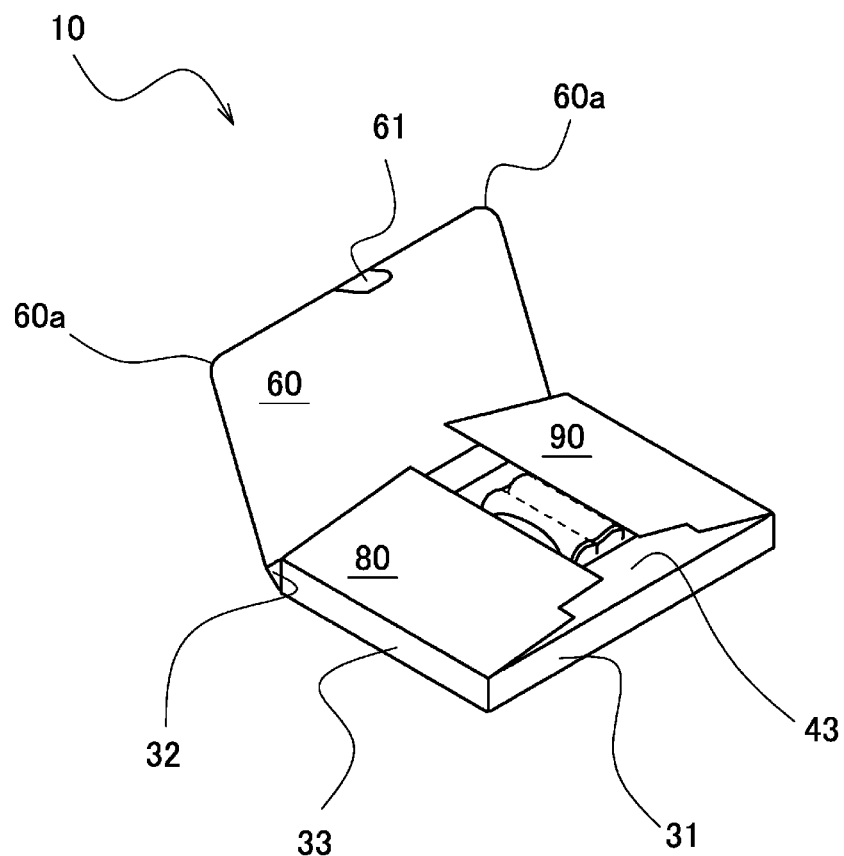
FIG. 8 is an assembly diagram showing a procedure of assembling the battery packaging container shown in FIG. 1 from the expanded state shown in FIG. 2, the procedure being a fourth assembling step.
Figure 9:
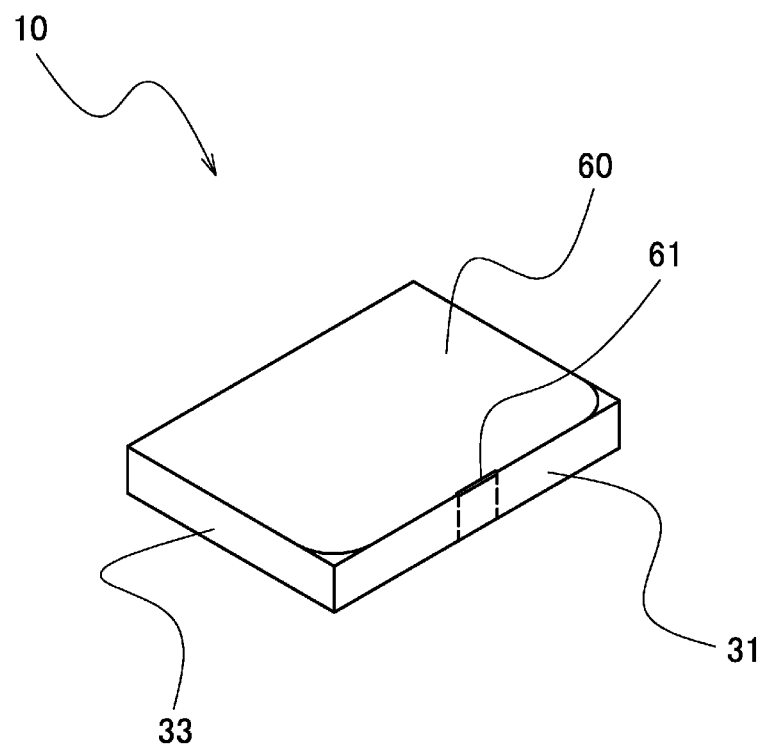
FIG. 9 is an assembly diagram showing a procedure of assembling the battery packaging container shown in FIG. 1 from the expanded state shown in FIG. 2, the procedure being a fifth assembling step.
Figure 9:
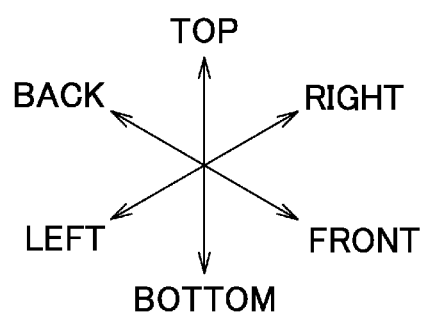

Description is now given of a method of assembling the battery packaging container 10 according to the first embodiment. FIG. 5 is an assembly diagram showing a procedure of assembling the battery packaging container 10 shown in FIG. 1 from the expanded state shown in FIG. 2, the procedure being a first assembling step. FIG. 6 is an assembly diagram showing a procedure of assembling the battery packaging container 10 shown in FIG. 1 from the expanded state shown in FIG. 2, the procedure being a second assembling step. FIG. 7 is an assembly diagram showing a procedure of assembling the battery packaging container 10 shown in FIG. 1 from the expanded state shown in FIG. 2, the procedure being a third assembling step. FIG. 8 is an assembly diagram showing a procedure of assembling the battery packaging container 10 shown in FIG. 1 from the expanded state shown in FIG. 2, the procedure being a fourth assembling step. FIG. 9 is an assembly diagram showing a procedure of assembling the battery packaging container 10 shown in FIG. 1 from the expanded state shown in FIG. 2, the procedure being a fifth assembling step.

<First Step>

First, as shown in FIG. 5, the first lateral wall 31 is bent at the bottom wall front bending line 21a, the second lateral wall 32 is bent at the bottom wall back bending line 22a, the third lateral wall 33 is bent at the bottom wall left bending line 23a, and the fourth lateral wall 34 is bent at the bottom wall right bending line 24a. Furthermore, the partition wall 40 is bent at the first lateral wall front bending line 31a, the left lateral edge support wall 51 and the right lateral edge support wall 52 are bent at the first folding perforation 53, the battery contact portion 55a of the base part 55 is bent at the root portion front bending line 43b, and the partition wall support portion 55b of the base part 55 is bent at the second folding perforation 55c. In addition, the lid 60 is bent at the second lateral wall back bending line 32c, the first flap 80 is bent at the third lateral wall left bending line 33b, and the second flap 90 is bent at the fourth lateral wall right bending line 34b. In addition, the engagement protrusion 42b and the holding protrusion 61 may be folded.

<Second Step>

Next, as shown in FIG. 6, the first lateral wall 31 is made to rise upward from the bottom wall front edge 21. Then, the engagement protrusion 42b of the partition wall 40 is inserted into the second lateral wall engagement hole 32a of the second lateral wall 32. As a consequence, the partition wall 40 is held to the second lateral wall 32, so that the partition wall 40 is maintained in the state of extending diagonally from the first lateral wall front edge 31b to the bottom wall back edge 22. In this case, the battery contact portion 55a of the base part 55 extends downward from the root portion 43, and the partition wall support portion 55b is in contact with the bottom wall 20 and the first lateral wall 31.

<Third Step>

Then, as shown in FIG. 7, the battery 100 is stored in the storage hole 41 of the partition wall 40. Specifically, the battery 100 is stored in the storage hole 41 from the side of the end portion 42 to the side of the root portion 43 of the partition wall 40. Note that FIG. 7 shows the state before the battery 100 is fully stored in the storage hole 41. Once the battery 100 is fully stored in the storage hole 41, the front side and both the left and right sides of the battery 100 are held from above by the left root lateral portion 44b and the right root lateral portion 45b in the partition wall 40 (FIGS. 3 and 4). As for the front end portion of the battery 100, the upper portion of the battery 100 is held from the front side by the root portion 43 and the battery contact portion 55a (FIG. 3 and FIG. 4). As for the back end portion of the battery 100, the lower portion of the battery 100 is further held from the back side by the end portion 42 (FIG. 4).

<Fourth Step>

Next, as shown in FIG. 8, the third lateral wall 33 is made to rise upward from the bottom wall left edge 23, and the fourth lateral wall 34 is made to rise upward from the bottom wall right edge 24. Then, the first flap 80 and the second flap 90 are folded, and the partition wall 40 is covered from above by the first flap 80 and the second flap 90. As a result, the battery 100 is held from above by the first flap 80 and the second flap 90 (FIG. 3).

<Fifth Step>

Next, as shown in FIG. 9, the second lateral wall 32 is made to rise upward from the bottom wall back edge 22. Then, the lid 60 is folded, and the holding protrusion 61 of the lid 60 is inserted into the partition wall back cut 40c of the partition wall 40, and the lid 60 is held to the partition wall 40. As a result, the battery 100 is held from above by the lid 60 in addition to the first flap 80 and the second flap 90 (FIGS. 3 and 4).

Description is now given of the operation and effects of the battery packaging container 10 according to the first embodiment. In the battery packaging container 10 according to the first embodiment, the bottom wall 20, the first lateral wall 31, the second lateral wall 32, the partition wall 40, and the lid 60 are integrally formed. The partition wall 40 extends diagonally from the first lateral wall front edge 31b of the first lateral wall 31 toward the bottom wall back edge 22 of the bottom wall 20. The partition wall 40 also includes the storage hole 41 to store the battery 100, the storage hole 41 being defined by the end portion 42 of the partition wall 40, the root portion 43 located on an opposite side of the end portion 42, and the left lateral portion 44 and the right lateral portion 45 that connect the end portion 42 and the root portion 43. The lid 60 further extends from the second lateral wall back edge 32b of the second lateral wall 32 to cover the partition wall 40 from above. Thus, in the battery packaging container 10 according to the first embodiment, the bottom wall 20, the first lateral wall 31, the second lateral wall 32, the partition wall 40, and the lid 60 are integrally formed, i.e., formed from one blank. In the battery packaging container 10, in the state where the battery 100 is stored in the storage hole 41, the upper portion of the battery 100 is supported by the root portion 43 of the partition wall 40, and the lower portion of the battery 100 is supported by the end portion 42 of the partition wall 40. Moreover, the battery 100 stored in the storage hole 41 is covered with the lid 60 from above. Therefore, forming the battery packaging container 10 from a single blank makes it possible to reduce the number of assembling steps and the number of parts. Supporting the battery 100 with the partition wall 40 and the lid 60 allows stable storage of the battery. Hence, the battery 100 can be restrained from moving while being conveyed, for example, and thereby damage of the battery 100 can be reduced. In addition, in the state where the lid 60 is opened, the upper portion of the battery 100 in the vicinity of the end portion 42 of the partition wall 40 is exposed without being supported by the partition wall 40. This makes it easy for a user to store and remove the battery 100.

Each width of the left lateral portion 44 and the right lateral portion 45 (a pair of lateral portions) in the partition wall 40 is formed to be wider toward the side of the root portion 43 from the side of the end portion 42. Specifically, the width W2 in the right-left direction in the left root lateral portion 44b is formed to be gradually wider toward the back side from the front side, and the width W4 in the right-left direction in the right root lateral portion 45b is formed to be gradually wider toward the back side from the front side. Hence, in the state where the battery 100 is fully housed in the storage hole 41, the front side and both the left and right sides of the battery 100 are held from above by the left root lateral portion 44b and the right root lateral portion 45b in the partition wall 40 (FIGS. 3 and 4). Therefore, it is possible to stably store the battery 100 with the left lateral portion 44 and the right lateral portion 45 in the partition wall 40. Hence, the battery 100 can be restrained from moving while being conveyed, for example, and thereby damage of the battery 100 can be reduced.

Moreover, the left lateral edge support wall 51 and the right lateral edge support wall 52 extend upward from at least both the lateral edges 42c, 42d in the end portion 42 to support the lid 60 in the state where the battery packaging container 10 is assembled (FIGS. 3 and 4). Specifically, in the state where the battery 100 is housed in the storage hole 41, the left lateral edge support wall 51 and the right lateral edge support wall 52 are in contact with the first flap 80 and the second flap 90 to support the lid 60 through the first flap 80 and the second flap 90. Accordingly, even in the case where, for example, an impact is applied to the lid 60 of the battery packaging container 10 while the battery 100 is conveyed, the left lateral edge support wall 51 and the right lateral edge support wall 52 receive the impact, and the impact is distributed. This makes it possible to avoid the impact directly transmitted to the battery 100, and to thereby prevent damage of the battery 100.

In the state where the battery packaging container 10 is assembled, the base part 55 extends downward from the root portion 43 of the partition wall 40 and comes into contact with the bottom wall 20. Hence, in the state where the battery packaging container 10 is assembled, the battery contact portion 55a of the base part 55 is in contact with the battery 100, and the partition wall support portion 55b of the base part 55 is in contact with the bottom wall 20 and the first lateral wall 31. Therefore, the battery 100 can be stably fixed by the battery contact portion 55a. Hence, for example, the battery 100 can be restrained from moving while being conveyed, and thereby damage of the battery 100 can be reduced. In the case where, for example, an impact is applied to the bottom wall 20 of the battery packaging container 10 while the battery 100 is conveyed, the partition wall support portion 55b receives the impact, and the impact is distributed. This makes it possible to avoid the impact directly transmitted to the battery 100, and to thereby prevent damage of the battery 100.

The first flap 80 extends from the upper end of the third lateral wall 33 to partially cover the partition wall 40 from above, and the second flap 90 extends from the upper end of the fourth lateral wall 34 to partially cover the partition wall 40 from above. Specifically, in the state where the battery 100 is housed in the storage hole 41, the battery 100 is held from above by the first flap 80 and the second flap 90. Therefore, supporting the battery 100 by the first flap 80 and the second flap 90 allows stable storage of the battery. Hence, for example, the battery 100 can be restrained from moving while being conveyed and thereby damage of the battery 100 can be reduced.

In the state where the battery packaging container 10 is assembled, the engagement protrusion 42b of the partition wall 40 is inserted into the second lateral wall engagement hole 32a, and holds the partition wall 40 to the second lateral wall 32. Thus, in the assembly process of the battery packaging container 10, the partition wall 40 can be held to the second lateral wall 32 by simply inserting the engagement protrusion 42b into the second lateral wall engagement hole 32a. Therefore, the battery packaging container 10 can be assembled easily.

Second Embodiment

Description is now given of a battery packaging container 11 according to a second embodiment. The battery packaging container 11 according to the second embodiment is different from the battery packaging container 10 according to the first embodiment in that the pair of lateral edge support walls 50 is not provided and a leading edge support wall 57 is provided as will be described later. Hereinafter, description of the component members having functions identical or similar to those of the battery packaging container 10 according to the first embodiment is omitted, and only the component members related to different functions will be designated by reference signs for description.

<Leading Edge Support Wall 57>

Figure 10:
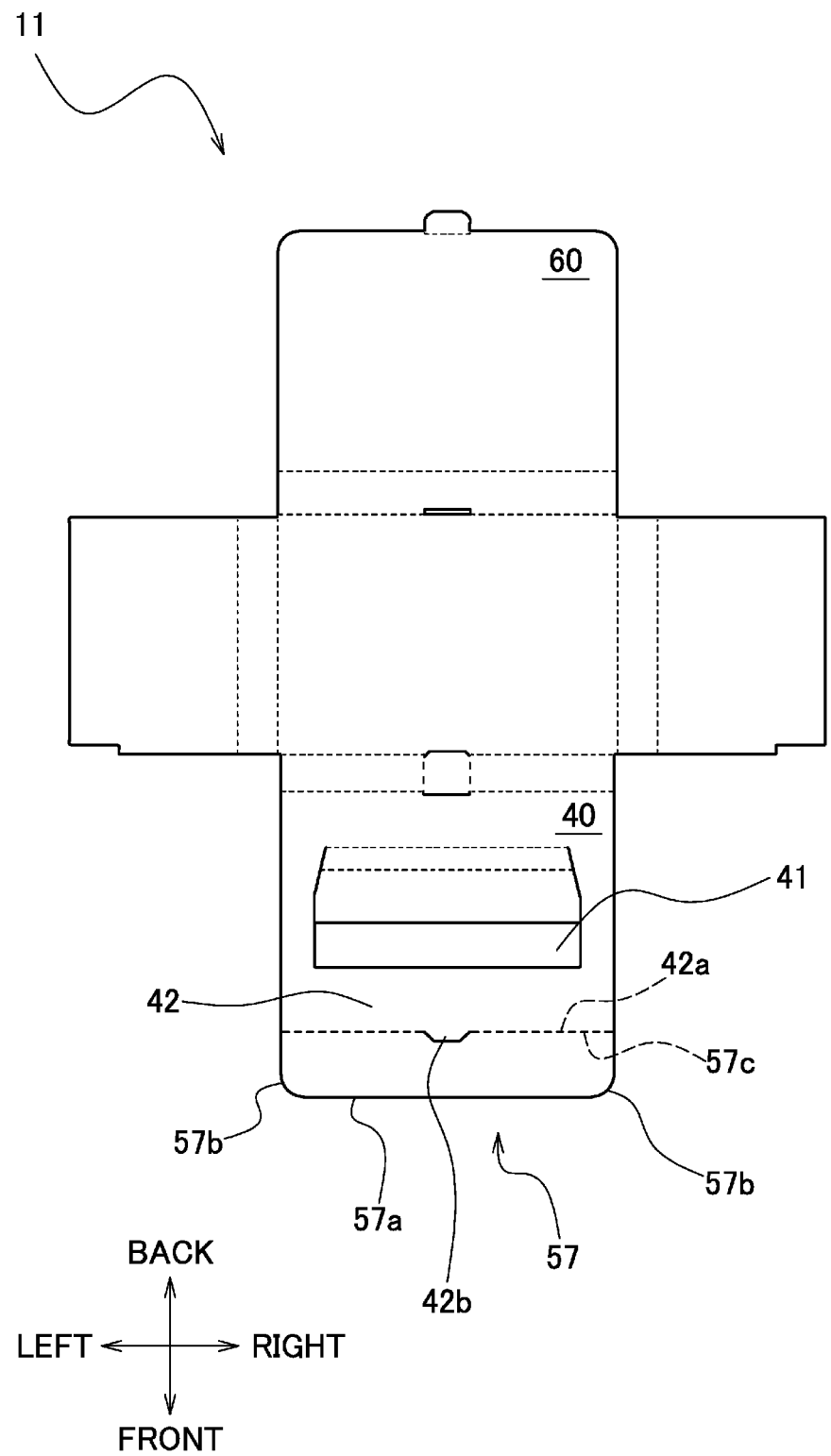
FIG. 10 is an expanded view showing a battery packaging container according to a second embodiment.

As shown in FIG. 10, the battery packaging container 11 further includes the leading edge support wall 57 formed integrally with the partition wall 40. The leading edge support wall 57 is approximately rectangular. Specifically, the leading edge support wall 57 has corner portions 57b with rounded corners on both right and left ends on the front side. The leading edge support wall 57 are linked to the partition wall 40 via a third folding perforation 57c. In the state where the battery packaging container 11 is assembled, the leading edge support wall 57 is bent at the third folding perforation 57c, and extends upward from a leading edge 42a of the end portion 42 and supports the lid 60. Specifically, the leading edge support wall 57 is in contact with the lid 60 at a front edge 57a located on the front side of the tip edge support wall 57 to support the lid 60. Note that the engagement protrusion 42b provided in the end portion 42 is not linked to the leading edge support wall 57. Accordingly, in the state where the leading edge support wall 57 is bent at the third folding perforation 57c, the engagement protrusion 42b protrudes forward from the leading edge 42a of the end portion 42.

Description is now given of the operation and effects of the battery packaging container 11 according to the second embodiment. In the battery packaging container 11 according to the second embodiment, the leading edge support wall 57 extends upward from the leading edge 42*a* of the end portion 42, and supports the lid 60 in the state where the battery packaging container 11 is assembled. Specifically, in the state where the battery is housed in the storage hole 41, the leading edge support wall 57 is in direct contact with the lid 60 to support the lid 60. Hence, in the case where, for example, an impact is applied to the lid 60 of the battery packaging container 11 while the battery is conveyed, the leading edge support wall 57 receives the impact, and the impact is distributed. This makes it possible to avoid the impact directly transmitted to the battery, and to thereby prevent damage of the battery.

Although the preferred embodiments of the present disclosure have been described in the foregoing, the present disclosure is not limited to the battery packaging containers 10, 11 according to the embodiments disclosed. The present disclosure embraces all aspects within the concept of the present disclosure and the claims. The respective component members may be selectively combined as appropriate to achieve the objective of the present disclosure or at least some of the effects thereof. For example, the shape of the battery packaging containers 10, 11 is not limited to the rectangular parallelepiped shape, and any shape is possible as long as the battery can be packaged. The bending lines in the battery packaging containers 10, 11 are not limited to straight lines, and may be wave lines or the like, for example. It is also possible to provide a battery packaging container including all the component members including the left lateral edge support wall 51 and the right lateral edge support wall 52 according to the first embodiment and the leading edge support wall 57 according to the second embodiment.

Embodiment of the present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

What is claimed is:

1. A battery packaging container, comprising:
   a plate-shaped bottom wall;
   a first lateral wall formed integrally with the bottom wall and extending upward from a first edge that is part of a contour of the bottom wall;
   a second lateral wall formed integrally with the bottom wall and extending upward from a second edge that is a portion of a side opposing to the first edge in the contour of the bottom wall;
   a partition wall formed integrally with the first lateral wall and extending diagonally from an upper end of the first lateral wall toward the second edge of the bottom wall, wherein the partition wall includes a storage hole to store a battery, the storage hole being defined by an end portion of the partition wall, a root portion located on an opposite side of the end portion, and a pair of lateral portions connecting the end portion and the root portion;
   a lid formed integrally with the second lateral wall and extending from an upper end of the second lateral wall to cover the partition wall from above; and
   a base part formed integrally with the partition wall, the base part extending downward from the root portion between the pair of lateral portions and being in contact with the bottom wall and the first lateral wall.

2. The battery packaging container according to claim 1, wherein widths of each of the pair of the lateral portions in the partition wall are formed to be wider toward a side of the root portion from a side of the end portion.

3. The battery packaging container according to claim 1, further comprising a pair of lateral edge support walls formed integrally with the partition wall, the lateral edge support walls extending upward from at least both lateral edges of the end portion to support the lid.

4. The battery packaging container according to claim 1, further comprising a leading edge support wall formed integrally with the partition wall, the leading edge support wall extending upward from a leading edge of the end portion to support the lid, wherein the leading edge support wall has a front edge defining an outermost edge of the partition wall, the front edge configured to contact the lid.

5. The battery packaging container according to claim 1, further comprising:
   a third lateral wall formed integrally with the bottom wall and extending upward from a third edge that is a portion connecting the first edge and the second edge in the contour of the bottom wall;
   a fourth lateral wall formed integrally with the bottom wall and extending upward from a fourth edge that is a portion opposing to the third edge in the contour of the bottom wall;
   a first flap formed integrally with the third lateral wall and extending from an upper end of the third lateral wall to partially cover the partition wall from above; and
   a second flap formed integrally with the fourth lateral wall and extending from an upper end of the fourth lateral wall to partially cover the partition wall from above.

6. The battery packaging container according to claim 1, wherein
   the second lateral wall includes an engagement hole extending through the second lateral wall, and
   the partition wall includes an engagement protrusion that protrudes from a leading edge of the end portion and is inserted into the engagement hole.

7. The battery packaging container according to claim 2, further comprising a pair of lateral edge support walls formed integrally with the partition wall, the lateral edge support walls extending upward from at least both lateral edges of the end portion to support the lid.

8. The battery packaging container according to claim 2, further comprising a leading edge support wall formed integrally with the partition wall, the leading edge support wall extending upward from a leading edge of the end portion to support the lid, wherein the leading edge support wall has a front edge defining an outermost edge of the partition wall, the front edge configured to contact the lid.

9. The battery packaging container according to claim 3, further comprising a leading edge support wall formed integrally with the partition wall, the leading edge support wall extending upward from a leading edge of the end portion to support the lid, wherein the leading edge support wall has a front edge defining an outermost edge of the partition wall, the front edge configured to contact the lid.

10. The battery packaging container according to claim 7, further comprising a leading edge support wall formed integrally with the partition wall, the leading edge support wall extending upward from a leading edge of the end portion to support the lid, wherein the leading edge support wall has a front edge defining an outermost edge of the partition wall, the front edge configured to contact the lid.

11. The battery packaging container according to claim 10, further comprising:

a third lateral wall formed integrally with the bottom wall and extending upward from a third edge that is a portion connecting the first edge and the second edge in the contour of the bottom wall;

a fourth lateral wall formed integrally with the bottom wall and extending upward from a fourth edge that is a portion opposing to the third edge in the contour of the bottom wall;

a first flap formed integrally with the third lateral wall and extending from an upper end of the third lateral wall to partially cover the partition wall from above; and a second flap formed integrally with the fourth lateral wall and extending from an upper end of the fourth lateral wall to partially cover the partition wall from above.

12. The battery packaging container according to claim 11, wherein the second lateral wall includes an engagement hole extending through the second lateral wall, and the partition wall includes an engagement protrusion that protrudes from the leading edge of the end portion and is inserted into the engagement hole.

13. The battery packaging container according to claim 1, wherein the base part comprises:

a battery contact portion extending downward from the root portion; and a partition wall support portion linked to the battery contact portion by a folding perforation, the partition wall support portion extending from the battery contact portion to the bottom wall and the first lateral wall.

14. The battery packaging container according to claim 3, wherein the position of the root portion is located on an opposite side of the end portion and connected to the upper end of the first lateral wall.

15. The battery packaging container according to claim 7, wherein the position of the root portion is located on an opposite side of the end portion and connected to the upper end of the first lateral wall.

16. The battery packaging container according to claim 3, wherein each of the lateral edge support walls is formed to be wider toward a leading edge of the end portion.

17. The battery packaging container according to claim 7, wherein each of the lateral edge support walls is formed to be wider toward a leading edge of the end portion.

* * * * *